United States Patent [19]

Staral

[11] Patent Number: 4,830,688

[45] Date of Patent: May 16, 1989

[54] MOISTURE RESISTANT SPLICE ASSEMBLY

[75] Inventor: John S. Staral, Austin, Tex.

[73] Assignee: Minnesota Mining and Manufacturing Company, St. Paul, Minn.

[21] Appl. No.: 122,370

[22] Filed: Nov. 19, 1987

[51] Int. Cl.[4] .............................................. H01B 13/06
[52] U.S. Cl. ........................................ 156/48; 156/49; 174/88 R; 174/110 S; 174/110 S R
[58] Field of Search ................ 156/48, 49; 174/88 R, 174/110 SR, 110 S

[56] References Cited

U.S. PATENT DOCUMENTS

| | | |
|---|---|---|
| 2,466,963 | 4/1949 | Patrick et al. . |
| 3,438,930 | 4/1969 | Beers . |
| 3,541,044 | 11/1970 | Beers . |
| 3,627,722 | 12/1971 | Seiter . |
| 3,689,454 | 9/1972 | Smith et al. . |
| 3,723,163 | 3/1973 | Schumacher . |
| 3,779,986 | 12/1973 | Smith et al. . |
| 3,912,696 | 10/1975 | Doughty . |
| 4,102,852 | 7/1978 | DeLaTorre et al. . |
| 4,239,674 | 12/1980 | Homan et al. . |
| 4,374,967 | 2/1983 | Brown et al. .......................... 528/15 |
| 4,423,918 | 1/1984 | Filreis et al. ........................ 339/98 P |
| 4,511,626 | 4/1985 | Schumacher .................... 428/425.6 |
| 4,539,345 | 9/1985 | Hansen ................................ 523/219 |
| 4,639,483 | 1/1987 | Billigmeier et al. ................ 524/296 |

Primary Examiner—Robert A. Dawson
Attorney, Agent, or Firm—Donald M. Sell; Walter N. Kirn; James V. Lilly

[57] ABSTRACT

A moisture resistant splice assembly for communications and electrical cables is provided. The assembly employs a moisture activatable encapsulant.

18 Claims, No Drawings

MOISTURE RESISTANT SPLICE ASSEMBLY

TECHNICAL FIELD

This invention relates to moisture resistant splice assemblies, such as those used in signal and energy (e.g., telecommunicatinos and electrical) lines.

BACKGROUND ART

Protection of splice assemblies from the adverse effects of water remains one of the most important considerations in installing and repairing signal and energy transmission service lines. Such protection is particularly important today because the overwhelming trend is to place such service lines beneath the ground.

Several methods have been employed to protect splice assemblies. For example, greases and grease-like encapsulants have been used. However, these materials generally lack any three dimensional structure and/or elongation properties. Consequently, they tend to flow away from the splice area they are intended to protect when they are subjected to elevated temperatures and external pressures such as gravity, ground pressure, water pressure, etc.

Gels and/or crosslinked sealants tend to overcome the problem of flow. However, the three dimensional nature of these materials renders them somewhat stiff, and this stiffness often precludes them from flowing around the splice adequately enough to provide complete encapsulation.

Two part encapsulates have also been proposed. While these materials generally provide complete encapsulation, they suffer from the disadvantage that they require the on site mixing of ingredients. This takes additional time, and requires special equipment and clean up. These steps all increase the cost and inconvenience of making the splice.

The above-described encapsulants suffer from yet another disadvantage. They entrap moisture that may enter the splice area. This exacerbates the problems caused by the moisture and accelerates deterioration of the splice.

Yet another approach is described in U.S. Pat. No. 4,639,483. This patent discloses a composition which employs a plasticizer (either a naphthenic or paraffinic oil), an aliphatic or an aromatic carboxylic acid, CaO or ZnO, optionally an elastomer which is soluble in the composition, and optionally a hydrophilic additive. When the composition comes into contact with water, the water and the oxide form a base which then reacts with the acid to form a soap which solidifies.

DISCLOSURE OF THE INVENTION

The present invention is directed to a splice assembly which employs a material that is activated by moisture to form a three-dimensional crosslinked network that blocks the ingress of water to the splice. The assembly comprises the moisture activatable material (sometimes also referred to as the encapsulant), at least two conductors spliced together, and, optionally, a closure (sometimes also referred to as a splice closure). Prior to exposure to moisture, this material is sufficiently fluid that it flows around and into the interstices of the splice assembly and establishes intimate contact with the splice. The moisture activatable material remains fluid until such time as it is contacted by moisture, such as through contact with liquid water or water vapor. While the encapsulant remains fluid, the splice closure is readily reenterable. Upon contact with moisture, the encapsulant begins to cross-link. Preferably the rate of crosslinking is sufficiently slow that the assembly remains reenterable for an extended period of time, but sufficiently high to effectively protect the splice.

In the preferred case the encapsulant consumes the moisture. Consequently, the encapsulant can actually improve (and even restore) service which has been impaired (or interrupted) through entry of water into the splice area.

DETAILED DESCRIPTION

The splice assembly of the invention may utilize a closure which may be of any shape desired. Many useful closures are known, and it will be appreciated that the exact design is a matter of choice based, inter alia, upon the type of splice being made. For example, U.S. Pat. No. 4,423,918 discloses a reenterable splice closure that is particularly useful when the closure is to be buried beneath the ground. Other splice closures which may be used in connection with this invention will, of course, be apparent as a result of reading this disclosure.

The moisture activatable materials useful in the invention are dielectric materials both before and after exposure to moisture. Upon crosslinking, they adhere tenaciously to both the splice and the spliced cables. As a result, a barrier is established which prevents ingress of moisture to the splice particularly along the cable. Thus, the crosslinked encapsulant serves as a particularly efficient barrier to core moisture penetration.

As noted above, the encapsulant is fluid enough to flow around the splice area and establish intimate contact therewith. In this regard, the encapsulant possesses rheological characteristics such that the force used to install the encapsulant will cause it to flow around the splice area. The precise rheological characteristics required of the encapsulant are not critical to the invention, and are influenced by a number of factors such as the encapsulant's ability to intimately contact the splice, the design of the splice closure, and so forth. Within these guidelines, it has been found that both liquid materials (.e.g, those with a room temperature viscosity of less than 1 poise) and paste materials (e.g., those with a temperature viscosity of more than 1 poise) are useful.

Encapsulants which are useful in the present invention include one part, dielectric, moisture activatable materials. Such materials include polymers which are activated by moisture to form three dimensional crosslinked structures and oligomers and prepolymers (including monomers) which are activated by moisture to form three dimensional crosslinked polymeric structures. Such materials may be selected from widely divergent classes of compounds and compositions. For example, one part polyurethane compounds and compositions form one class of useful moisture activatable materials. Generally speaking these materials comprise polyurethane polymers and prepolymers having terminal isocyanate groups. They can comprise a polyfunctional isocyanate or isocyanate prepolymer and one or more other materials such as terpene-phenolic resins, silane compounds (e.g., those containing the SiOR group), catalysts, and the like. Such materials have been described in the literature. See for example U.S. Pats. Nos. 3,627,722; 4,511,626; 4,539,345; and 3,723,163 incorporated herein by reference.

An example of a commercially available one part polyurethane composition useful herein is the Scotch-Seal TM 5200 family of materials available from the Minnesota Mining and Manufacturing Company of St. Paul, Minnesota. These materials have a viscosity of at least 100 poise at 25° C. and are described as curing to a tack free state in 48 hours at 25° C. and 50% relative humidity. These materials are further described as having a Shore A hardness of 60 when fully cured.

One part polysulfides are another class of materials useful as the encapsulant. These materials typically comprise liquid polyalkylene polysulfide polymer and a dormant curing agent which is activated by moisture to cure the polysulfide. An oxidizing material such as zinc, calcium, barium, and strontium oxide together with barium hydroxide may be included in the polysulfide composition if desired. A desiccating agent may also be present to maintain the composition in dry condition during storage. Materials of this type are described in U.S. Pat. Nos. 2,466,963 and 3,912,696 incorporated herein by reference.

An example of a commercially available one part polysulfide useful herein is the Weatherban TM 101 family of materials available from the Minnesota Mining and Manufacturing Company of St. Paul, Minn. These materials have a viscosity of 14,000 poise at 25° C. and are described as curing to a tack free state in 2 hours at 25° C. and 50% relative humidity. These materials are further described as having a Shore A-2 hardness of 20-30 when fully cured.

Yet another class of moisture sensitive materials useful in the invention are the one part organopolysiloxanes. These materials are characterized by containing the siloxane linkage

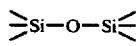

in the backbone of the polymer. These materials typically comprise the polysiloxane a catalyst therefor, and a crosslinking agent. A number of such materials have been described in the literature. See for example U.S. Pat. Nos. 3,689,454; 3,438,930; 3,541,044; 3,779,986; and 4,102,852 incorporated herein by reference.

A number of organopolysiloxanes useful herein are commercially available. These materials include room temperature vulcanizing (RTV) materials such as the Silastic TM family of materials from the Dow Corning Corporation of Midland, Mich. are useful. Other useful organopolysiloxanes are available from the General Electric Company, Silicone Products Division as RTV series and Shin-Etsu Chemical Co. These materials have viscosities which may be as low as 1 poise and most commonly above 20 poise.

The moisture activatable materials may also be formulated with a variety of other materials. For example, fillers, colorants (e.g., dyes and pigments), copolymerizable materials, catalysts and curatives, crosslinking agents, UV adsorbers, antioxidants, fungicides, plasticizers, solvents, and the like may be added if desired.

The invention is further illustrated in the following illustrative examples. The materials, amounts and conditions employed in these examples are illustrative only and should not be construed as limiting the invention.

EXAMPLES

Example 1

Into each of two 3M 3800 Buried Service Wire (BSW) "Super Can" bodies was loaded 125-127 grams of Scotch Seal TM 5200 Adhesive/Sealant (5200 encapsulant). The sealant was maintained in a nitrogen atmosphere until use. Two, two-pair splices were prepared from Western Electric 22 gauge "B" service wire and Scotchlok TM UR connectors via standard splicing procedures. Each of these splices was then positioned into a 3M 3800 BSW "Super Can" Encapsulation Kit splice tray and correspondingly each tray was then pressed into one of the 3800 BSW Kit bodies containing 5200 Adhesive/Sealant material. In each case, the 3800 BSW Kit cover was then immediately screwed onto the corresponding body. Utilizing analogous procedures, four additional splice assemblies were prepared utilizing standard production 3M BSW "Super Can" Encapsulation Kits. Two of these kits employed standard quantities of the calcium soap based grease (the "standard grease") employed in 3M's 3800 "Super Can" Buried Service Wire Kits as the encapsulant and the remaining two kits employed standard quantities of a commercially available lithium soap based grease encapsulant (available from Fiske Brothers Refining Co.) as the encapsulant. The tip to ring insulation resistances of all splice assemblies were then measured (at 50 volts DC using a General Radio Model 1864 megohmeter) and found to be $10^{12}$ ohms. All of the splice assemblies were then completely submerged for 27 days under water in a 4 liter beaker. In each case the outer sheaths of the spliced service wires extending beyond the 3800 Kit body were of sufficient length to protrude above the water line and were positioned in that direction. After submersion for the 27 day period, all splice assemblies were subsequently removed from the water and their corresponding insulation resistances immediately remeasured. The insulation resistances of all splice assemblies were determined to be $10^{12}$ ohms. In the case of each of the splice assemblies employing the 5200 Sealant, the encapsulant exposed to moisture at the cable entry port areas had cured to form a tough, elastomeric material. This example demonstrates the performance efficacy of the one-part, moisture activatable materials as encapsulants for telecommunications splices.

Example 2

Two, two-pair splices were prepared from Western Electric 22 gauge "B" service wire and unfilled ("dry") Scotchlok TM UR connectors via standard splicing procedures. These splices were subsequently inserted into separate 3 oz. Dixie TM paper cups, one of which was filled with the 5200 encapsulant and the other of which was filled with the standard grease. In each case, after insertion of the splice into the encapsulant material, the corresponding encapsulant material was smoothed at the point of insertion to insure complete encapsulation about the connectors and splice wires. Each of these splices assemblies was then completely submerged in water in a 1 liter beaker which was in turn covered with aluminum foil and placed for 11 days in an oven which was maintained at 140° F. (60° C.). In each case, the outer sheaths of the spliced service wires extending beyond the 3800 Kit body were of sufficient length to protrude above the water line and were positioned in that direction. At the conclusion of this 11 day period, the splice assemblies were subsequently removed from the water environment and their tip to ring insulation resistances were subsequently remeasured at 50 volts DC using a General Radio Model 1864 megohmeter. The corresponding tip to ring insulation resistance of the splice assembly employing the 5200 encapsulant was determined to be $5 \times 10^{11}$ ohms while that of the splice assembly employing the standard grease was determined to be only $1 \times 10^6$ ohms. The initial tip to ring insulation resistance for each was $10^{11}$ to $10^{12}$ ohms. The 5200 encapsulant exposed to the moisture had cured to form a tough, elastomeric material.

This example demonstrates the performance efficacy of the one-part, moisture activatable materials as encapsulants for telecommunication splices. This example also demonstrates the superior performance of such materials in such applications under severe environmental conditions.

Example 3

3M 3800 BSW "Super Can" Encapsulation Kit body was loaded with approximately 125 grams of the 5200 encapsulant. A two-pair splice was prepared from Western Electric 22 gauge "B" service wire and unfilled ("dry") Scotchlok TM UR connectors. After this splice was positioned into a 3M 3800 BSW "Super Can" Encapsulation Kit tray, this tray was pressed into the body containing the 5200 encapsulant and subsequently the 3800 Kit cover was screwed onto this body. The cover was then removed and the tip to ring insulation resistance of the splice assembly was measured at 50 volts DC using a General Radio Model 1864 megohmeter and determined to be $2 \times 10^{10}$ ohms. Without replacement of the 3800 Kit cover, this splice assembly was then completely submerged in ambient temperature water in a 1 liter beaker for 11 days. The outer sheaths of the spliced service wires extending beyond the 3800 Kit body were of sufficient length to protrude above the water line and were positioned in that direction. The splice assembly was removed from the water after 11 days submersion and the corresponding tip to ring insulation resistance of the splice was subsequently remeasured and determined to have actually improved to $1.5 \times 10^{12}$ ohms. The 5200 encapsulant exposed to moisture h crosslinked to form a tough, elastomeric material.

This example demonstrates the performance efficacy of the one-part, moisture activatable materials as encapsulants for telecommunications splices even under conditions in which the installation craftsmanship is substandard (e.g., 3800 BSW "Super Can" cover was not replaced). The results further show that the one-part, moisture activatable materials adhere tenaciously to the cable and splice after crosslinking so as to prevent any moisture from reaching the conductor area.

Example 4

Into each of the three 3M 3800 BSW "Super Can" bodies was loaded 149-151 grams of the 5200 encapsulant. Two-pair and five-pair splices were then prepared from Western Electric 22 gauge "B" service wire and Scotchlok TM UP3 unfilled connectors via standard splicing procedures. In each case splices were prepared utilizing lengths of service wire such that after splice completion, 12-18 inches of wire would extend beyond the 3800 BSW Kit body. Each of these splices were then positioned into a Standard 3M 3800 BSW Kit splice tray and correspondingly each tray was then pressed into one of the 3800 BSW Kit bodies containing the 5200 encapsulant. In each case, the 3800 BSW Kit cover was immediately screwed onto the corresponding body. A corresponding set of splice assemblies were also prepared via analogous procedures utilizing three standard 3M 3800 BSW Encapsulation Kits containing the standard grease encapsulant. The tip to ring insulation resistances of all splices were then measured at 50 volts DC using a General Radio Model 1864 Megohmeter. All splice assemblies were subsequently completely (including the full lengths of the spliced wires) submerged under five vertical feet (1.52 m) of ambient temperature water for 11 days. All samples were subsequently removed from the water and the resistance across each of the corresponding splices remeasured as a function of time after removal from the water.

The results of this experimentation are summarized in Table 1. The observed rates of recoveries of the insulation resistances of the splice assemblies employing the 5200 encapsulant show that when water enters the splice area (presumably in this case via "core" water routes) the moisture reactive character of the one-part, moisture activatable encapsulant effectively improves and/or preserves and/or restores the efficacy of the splice. In the case of each of the splice assemblies employing the 5200 encapsulant, the encapsulant exposed to moisture at the cable entry port area had cured to form a tough, elastomeric material.

TABLE 1

| Sample No. | Splice Type | Encapsulant | Splice Tip to Ring Insulation Resistance (ohms) | | | |
|---|---|---|---|---|---|---|
| | | | Before H$_2$O Immersion | After H$_2$O Immersion | | |
| | | | | Initial | 2 Hours | 19 Days |
| 1 | 2 Pair | 5200 Encapsulant | $5 \times 10^{11}$ | $5 \times 10^6$ | $3 \times 10^{11}$ | $1 \times 10^{12}$ |
| 2 | 5 Pair | 5200 Encapsulant | $5 \times 10^{11}$ | $1 \times 10^{11}$ | $2 \times 10^{11}$ | $5 \times 10^{11}$ |
| 3 | 5 Pair | 5200 Encapsulant | $5 \times 10^{11}$ | Short | $5 \times 10^{11}$ | $5 \times 10^{11}$ |
| 4 | 2 Pair | Std. Grease Encapsulant | $1.5 \times 10^{11}$ | $2 \times 10^5$ | $2 \times 10^{11}$ | $2 \times 10^{11}$ |
| 5 | 5 Pair | Std. Grease Encapsulant | $1.5 \times 10^{11}$ | Short | Short | Short |
| 6 | 5 Pair | Std. Grease Encapsulant | $2 \times 10^{11}$ | Short | Short | Short |

Example 5

Into each of eight standard 3M 3800 BSW "Super Can" Kit bodies was loaded 149-151 grams of the 5200 encapsulant. Four, two-pair splices were prepared from 22 gauge Service Wire with a copper shield and Western Electric 701-2BT wire connectors via standard splicing procedures. Four additional five-pair splices similarly were prepared utilizing Western Electric 22 gauge "B" service wire with a copper shield and Western Electric 701-2BT wire connectors. Each of these splices was then positioned into a 3M 3800 BSW "Super Can" Encapsulation Kit splice tray and correspondingly each tray was then pressed into one of the 3800 BSW Kit bodies containing the 5200 encapsulant. In each case the 3800 BSW Kit cover was then immediately screwed onto the corresponding body. The tip to ring insulation resistances of all splice assemblies were then measured at 250 volts DC using a General Radio Model 1864 megohmeter. A voltage of 48 volts was then applied between the tip and ring of each pair. All splice assemblies were subsequently placed in an environmental chamber in which the temperature was cycled three hundred times between $+40°$ F. and $+140°$ F. at 95% relative humidity over a twelve hour period and with a 4.75 hour dwells at the temperature extremes.

The tip to ring insulation resistance of all splice assemblies were remeasured periodically as a function of the number of temperature cycles utilizing the same procedure employed for the measurement of the corresponding initial insulation resistances. The results of this experimentation are summarized in Table 2.

These results demonstrate the performance efficacy of the one-part moisture activalable polyurethane encapsulant as all samples were observed to exceed the $10^8$ ohms tip to ring insulation resistance level typically required by the telecommunications industry at the conclusion of such testing.

TABLE 2

| Sample No. | Splice Type | Splice Tip to Ring Insulation Resistance (ohms) Number of Cycles | | | | |
|---|---|---|---|---|---|---|
| | | Initial | 37 | 75 | 150 | 300 |
| 1 | 2 Pair | $4 \times 10^{12}$ | $3 \times 10^{12}$ | $2 \times 10^{12}$ | $2 \times 10^{12}$ | $6 \times 10^{11}$ |
| 2 | 2 Pair | $5 \times 10^{12}$ | $1.5 \times 10^{12}$ | $1.5 \times 10^{12}$ | $1.5 \times 10^{12}$ | $3.5 \times 10^{11}$ |
| 3 | 2 Pair | $1.7 \times 10^{11}$ | $3 \times 10^{12}$ | $2.6 \times 10^{12}$ | $2.6 \times 10^{12}$ | $2 \times 10^{11}$ |
| 4 | 2 Pair | $3 \times 10^{12}$ | $3 \times 10^{11}$ | $2.2 \times 10^{12}$ | $1.7 \times 10^{12}$ | $1.7 \times 10^{12}$ |
| 5 | 5 Pair | $1 \times 10^{12}$ | $1.2 \times 10^{12}$ | $1 \times 10^{12}$ | $1 \times 10^{12}$ | $1.3 \times 10^{12}$ |
| 6 | 5 Pair | $1 \times 10^{12}$ | $1.8 \times 10^{12}$ | $1.4 \times 10^{12}$ | $1 \times 10^{12}$ | $1.7 \times 10^{11}$ |
| 7 | 5 Pair | $9 \times 10^{11}$ | $2 \times 10^{12}$ | $1.3 \times 10^{12}$ | $1 \times 10^{12}$ | $1.2 \times 10^{12}$ |
| 8 | 5 Pair | $4 \times 10^{12}$ | $3 \times 10^{12}$ | $1.3 \times 10^{12}$ | $1.3 \times 10^{12}$ | $1 \times 10^{12}$ |

Example 6

Into each of six 3M 3800 BSW "Super Can" Kit bodies was loaded 149-151 grams of the 5200 encapsulant. Six, five-pair splices were prepared from 22 gauge Ericcson Service wire with a copper shield and Western Electric 701-2BT wire connectors via standard splicing procedures. Each of these splices was then positioned into a standard 3M 3800 BSW "Super Can" Encapsulation Kit splice tray and correspondingly each tray was then pressed into one of the 3800 BSW Kit bodies containing the 5200 encapsulant. In each case the 3800 BSW Kit cover was then immediately screwed onto the correspondingly body. The tip to ring insulation resistances of all splice assemblies were then measured at 250 volts DC using a General Radio Model 1864 megohmeter. A voltage of 48 volts was then applied between the tip and ring of each pair. All splice assemblies were subsequently completely immersed (including the full lengths of the spliced wires) under 30 vertical inches (76.2 cm) of 70° F. (21° C.) water for 177 days. The tip to ring insulation resistances of splice assemblies were remeasured periodically as a function of water immersion time utilizing the same procedure employed for the measurement of the corresponding initial insulation resistances. The results of this experimentation are summarized in Table 3. Those results demonstrate the performance efficacy of the one-part moisture activatable polyurethane encapsulant as all samples were observed to exceed the $10^8$ ohms insulation resistance level typically required by the telecommunications industry at the conclusion of such testing.

TABLE 3

| Sample No. | Splice Tip to Ring Insulation Resistance (ohms) Number of Days Immersed | |
|---|---|---|
| | Initial | 117 |
| 1 | $1.5 \times 10^{12}$ | $2.6 \times 10^{12}$ |
| 2 | $1.5 \times 10^{12}$ | $2 \times 10^{12}$ |
| 3 | $4 \times 10^{11}$ | $2 \times 10^{11}$ |
| 4 | $1.7 \times 10^{12}$ | $3 \times 10^{12}$ |
| 5 | $3 \times 10^{11}$ | $2 \times 10^{12}$ |
| 6 | $2.4 \times 10^{11}$ | $1.1 \times 10^{12}$ |

Example 7

Into each of three 3M 3800 BSW "Super Can" Kit bodies was loaded 177-179 grams of 3M Weatherban TM 101 One-Part Gray Polysulfide Sealant. Into each of another three 3M 3800 BSW "Super Can" Kit bodies was loaded 108-110 grams of Dow Corning Silastic TM 738 RTV Non-Corrosive Adhesive/Sealant. Six, two-pair splices were prepared from Western Electric 22 gauge "B" Service Wire with a copper shield and 3M UP3 unfilled wire connectors. Each of these splices was then positioned into a 3M 3800 BSW "Super Can" Encapsulation Kit splice tray and correspondingly each of these splice trays was pressed into one of the 3800 BSW Kit bodies containing either the 3M or Dow Corning Sealant material. In each case the 3800 BSW Kit cover was then immediately screwed onto the corresponding body. The tip to ring insulation resistances of all splice assemblies where then measured at 250 volts DC utilizing a General Radio Model 1864 megohmeter. Each of these splice assemblies was then completely submerged in 12 vertical inches (30.5 cm) of ambient temperature water for 32 days. In each case, the outer sheaths of the spliced service wires extending beyond the 3800 Kit body were of sufficient length to protrude above the water line and were positioned in that direction. The corresponding tip to ring insulation resistances of these splice assemblies were remeasured as a function of water immersion time utilizing the same procedure employed in the determination of the initial insulation resistances. The results are summarized in Table 4. The results of these studies demonstrate the efficacies of one-part, moisture activatable polysulfide and silicone materials as splice encapsulants.

TABLE 4

| Sample No. | Encapsulant | Splice Tip to Ring Insulation Resistance (ohms) Number of Days Immersed | | | |
|---|---|---|---|---|---|
| | | Initial | 7 | 17 | 32 |
| 1 | Silastic TM 738 RTV | $1 \times 10^{12}$ | $1.5 \times 10^{12}$ | $7 \times 10^{11}$ | $2 \times 10^{12}$ |

TABLE 4-continued

| Sample No. | Encapsulant | Splice Tip to Ring Insulation Resistance (ohms) Number of Days Immersed | | | |
|---|---|---|---|---|---|
| | | Initial | 7 | 17 | 32 |
| 2 | Silastic TM 738 RTV | $3 \times 10^{11}$ | $3 \times 10^{11}$ | $7 \times 10^{11}$ | $5 \times 10^{11}$ |
| 3 | Silastic TM 738 RTV | $3 \times 10^{12}$ | $1 \times 10^{12}$ | $5 \times 10^{11}$ | $2 \times 10^{12}$ |
| 4 | Weatherban TM 101 | $5 \times 10^{11}$ | $5 \times 10^{11}$ | $5 \times 10^{11}$ | $3 \times 10^{11}$ |
| 5 | Weatherban TM 101 | $1 \times 10^{12}$ | $5 \times 10^{11}$ | $5 \times 10^{11}$ | $8 \times 10^{11}$ |
| 6 | Weatherban TM 101 | $4 \times 10^{11}$ | $1 \times 10^{12}$ | $8 \times 10^{11}$ | $3 \times 10^{11}$ |

I claim:

1. A moisture resistant communications splice assembly comprising at least two conductors spliced to each other and a one-part, moisture activatable encapsulant material capable of forming a crosslinked polymeric material surrounding and in intimate contact with said spliced conductors; wherein when said encapsulant comprises a polyurethane polymer, prepolymer, or combination thereof, said polyurethane polymer or prepolymer is essentially free of at least one of terpene-phenolic resin and silane.

2. A splice assembly according to claim 1 further comprising a closure containing said spliced conductors and said encapsulant.

3. A splice assembly according to claim 1 wherein said encapsulant is selected from the group consisting of said polyurethane polymer or prepolymer, a polysulfide polymer or prepolymer, an organopolysiloxane polymer or prepolymer, and combinations thereof.

4. A splice assembly according to claim 3 wherein said encapsulant is said polyurethane.

5. A splice assembly according to claim 4 wherein said polyurethane comprises a polyfunctional isocyanate or isocyanate prepolymer.

6. A splice assembly according to claim 5 wherein said polyurethane further comprises an effective amount of one or more catalysts.

7. A splice assembly according to claim 3 wherein said encapsulant is said polysulfide.

8. A splice assembly according to claim 3 wherein said encapsulant is said organopolysiloxane.

9. A splice assembly according to claim 3 wherein said encapsulant further comprises at least one additive.

10. A splice assembly according to claim 1 wherein said encapsulant has been exposed to moisture to form an at least partially crosslinked polymeric network.

11. A splice assembly according to claim 10 wherein said encapsulant has formed an essentially completely crosslinked polymeric network.

12. A method of forming a moisture resistant splice assembly comprising the steps of:
 (a) connecting together the conductors of at least two separate conductive cables to form a splice;
 (b) placing said splice in a container containing a one-part, moisture activatable encapsulant material capable of forming a crosslinked polymer upon contact with moisture, wherein when said encapsulant comprises a polyurethane polymer or prepolymer, or combination thereof, said polyurethane polymer or prepolymer is essentially free of at least one of terpene-phenolic resin and silane; and
 (c) forcing said encapsulant into intimate contact with said splice.

13. A method of forming a moisture resistant splice assembly comprising the steps of:
 (1) connecting together the conductors of at least two separate conductive cables to form a splice;
 (2) placing said splice in a container containing a one-part, moisture activatable encapsulant material capable of forming a crosslinked polymer upon contact with moisture, said container comprising:
  (a) a cup having a bottom, a side wall with an opening therein for receiving said conductive cables, an open top, and fastening means adjacent said open top, wherein said encapsulant substantially fills said cup,
  (b) a tray adapted to receive said splice and fit in said cup,
  (c) a cover to matingly engage said fastening means and force said splice into said encapsulant; and
 (3) forcing said encapsulant into intimate contact with said splice.

14. A method of protecting a splice in signal and energy transmission lines from the effects of moisture comprising the steps of:
 (a) intimately contacting said splice with a substantially unreacted, one-part, moisture activatable encapsulant which forms a crosslinked polymer when exposed to moisture to form a splice assembly, and
 (b) placing said splice assembly in an environment where moisture is present
 (c) permitting said encapsulant to consume said moisture by reacting therewith,
wherein when said encapsulant comprises a polyurethane polymer or prepolymer, or combination thereof, said polyurethane polymer or prepolymer is essentially free of at least one of terpene-phenolic resin and silane.

15. A method of improving the transmission characteristics of a splice in signal transmission and energy lines comprising the steps of:
 (a) intimately contacting said splice with a one-part, moisture activatable encapsulant which forms a crosslinked polymer in the presence of moisture to form a splice assembly, and
 (b) permitting said encapsulant to consume any moisture present by reacting therewith, thereby eliminating said moisture from said splice and improving said transmission characteristics,
wherein if said encapsulant comprises a polyurethane polymer or prepolymer, or combination thereof, said polyurethane polymer or prepolymer is essentially free of at least one of terpene-phenolic resin and silane.

16. A splice assembly according to claim 1 wherein said encapsulant material is exposed to moisture and said encapsulant consumes said moisture.

17. A splice assembly according to claim 4 wherein at least one of said terpene-phenolic resin or said silane is present at a level of less than 0.1 parts per 100 parts of said polyurethane.

18. A moisture resistant communication splice assembly comprising a container of a size sufficient to receive the ends of at least two conductors spliced to each other, said container containing a one-part, moisture activatable encapsulant material capable of forming a crosslinked polymeric material surrounding and in intimate contact with said spliced conductors and cover means for said container for forcing said encapsulant material into intimate contact with said splice, wherein if said encapsulant material comprises a polyurethane polymer or prepolymer, or combination thereof, said polyurethane polymer or prepolymer is essentially free of at least one of terpene-phenolic resin and silane.

* * * * *

UNITED STATES PATENT AND TRADEMARK OFFICE
CERTIFICATE OF CORRECTION

PATENT NO.  : 4,830,688

DATED       : May 16, 1989

INVENTOR(S) : John S. Staral

It is certified that error appears in the above-identified patent and that said Letters Patent is hereby corrected as shown below:

Col. 1, line 7, "telecommunicatnos" should be

— telecommunications —.

Col. 1, line 31, "encapsulates" should be

— encapsulants —.

Col. 2, line 43, "(.e.g," should be — (e.g., —.

Col. 4, line 65 "over" should be — oven —.

Col. 5, line 59 "h" should be — had —.

Col. 7, line 52 "correspondingly" should be

— corresponding —.

Signed and Sealed this

Twenty-seventh Day of March, 1990

Attest:

JEFFREY M. SAMUELS

*Attesting Officer*     *Acting Commissioner of Patents and Trademarks*